US009518498B1

(12) United States Patent
Tylutki et al.

(10) Patent No.: US 9,518,498 B1
(45) Date of Patent: Dec. 13, 2016

(54) REGULATION OF A DIESEL EXHAUST AFTER-TREATMENT SYSTEM

(71) Applicant: GM GLOBAL TECHNOLOGY OPERATIONS LLC, Detroit, MI (US)

(72) Inventors: Vincent J Tylutki, Livonia, MI (US); Igor Anilovich, Walled Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/837,338

(22) Filed: Aug. 27, 2015

(51) Int. Cl.
  *F01N 3/00* (2006.01)
  *F01N 11/00* (2006.01)
  *F01N 3/021* (2006.01)
  *F01N 9/00* (2006.01)

(52) U.S. Cl.
  CPC ........... *F01N 11/00* (2013.01); *F01N 3/021* (2013.01); *F01N 9/002* (2013.01); *F01N 2550/04* (2013.01); *F01N 2900/1606* (2013.01)

(58) Field of Classification Search
  CPC .......... F01N 11/00; F01N 3/021; F01N 9/002; F01N 2550/04; F01N 2900/1606
  USPC ........................................................... 60/285
  See application file for complete search history.

(56) References Cited

U.S. PATENT DOCUMENTS

| 6,928,809 | B2* | 8/2005 | Inoue | F01N 3/023 55/DIG. 30 |
| 2007/0056272 | A1* | 3/2007 | Dollmeyer | F01N 3/035 60/297 |
| 2007/0125349 | A1* | 6/2007 | Zanini-Fisher | F01N 11/00 123/679 |
| 2008/0215205 | A1* | 9/2008 | Kariya | F01N 11/002 701/31.4 |
| 2011/0131954 | A1* | 6/2011 | Parnin | F01N 3/027 60/276 |
| 2011/0232364 | A1* | 9/2011 | Koizumi | B01D 46/0057 73/23.33 |
| 2012/0144813 | A1* | 6/2012 | Yahata | F01N 11/007 60/311 |
| 2012/0216507 | A1* | 8/2012 | Nieuwstadt | F01N 3/101 60/274 |

* cited by examiner

*Primary Examiner* — Jason Shanske
(74) *Attorney, Agent, or Firm* — Quinn Law Group, PLLC

(57) ABSTRACT

A method is disclosed for regulating an exhaust after-treatment (AT) system having a diesel particulate filter (DPF) in fluid communication with a diesel engine. The method includes detecting operation of the diesel engine during which the engine generates a flow rate of particulate matter (PM) directed into the DPF. The method also includes detecting a flow rate of PM exiting the DPF in response to the flow rate of PM directed into the DPF. The method additionally includes tracking the detected flow rate alongside a predicted PM flow rate for monitoring and comparison thereof. The method also includes pausing in time the tracking of the predicted flow rate, if the detected flow rate has experienced a decline. Furthermore, the method includes resuming tracking the predicted flow rate when the detected flow rate returns to a value before the decline and using such value to regulate operation of the AT system.

20 Claims, 3 Drawing Sheets

REGULATION OF A DIESEL EXHAUST AFTER-TREATMENT SYSTEM

TECHNICAL FIELD

The present disclosure is drawn to a system and a method for regulating an exhaust after-treatment (AT) having a diesel particulate filter (DPF).

BACKGROUND

Various exhaust after-treatment devices have been developed to effectively limit exhaust emissions from internal combustion engines. An after-treatment system for a modern diesel engine exhaust typically incorporates a diesel particulate filter (DPF) for collecting and disposing of the sooty particulate matter emitted by the diesel engine prior to the exhaust gas being discharged to the atmosphere.

Generally, a DPF acts as a trap for removing the particulate matter from the exhaust stream. A typical DPF contains precious metals, such as platinum and/or palladium, which serve as catalysts to further oxidize soot and hydrocarbons present in the exhaust stream. The DPF may be regenerated or cleaned using superheated exhaust gas to burn off the collected particulate. Efficiency of the DPF is typically assessed via a particulate matter sensor configured to detect an amount of particulate matter that managed to pass through the DPF.

SUMMARY

A method is disclosed for regulating an exhaust after-treatment (AT) system having a diesel particulate filter (DPF) in fluid communication, via an exhaust system, with a diesel engine. The method includes detecting operation of the diesel engine during which the engine generates a flow rate of particulate matter (PM) directed via the exhaust system into the DPF. The method also includes detecting, via a PM sensor, a flow rate of particulate matter exiting the DPF in response to the flow rate of particulate matter directed into the DPF. The method additionally includes communicating, via the PM sensor to a controller, a signal indicative of the detected flow rate of particulate matter exiting the DPF.

The method also includes tracking the detected flow rate of particulate matter exiting the DPF alongside a predicted particulate matter flow rate for monitoring and comparison thereof. The method additionally includes pausing in time the tracking of the predicted particulate matter flow rate, if the detected flow rate of particulate matter exiting the DPF has experienced a decline. The method also includes resuming tracking the predicted particulate matter flow rate when the detected flow rate of particulate matter exiting the DPF returns to a value before the decline. Furthermore, the method includes regulating operation of the AT system using the detected flow rate of particulate matter exiting the DPF when the detected flow rate returns to the value before the decline.

The method may also include comparing the detected flow rate of particulate matter exiting the DPF with a particulate matter flow rate threshold and regulating operation of the AT system using the detected flow rate of particulate matter exiting the DPF, if the predicted particulate matter flow rate corresponding in time to the detected flow rate is less than the particulate matter flow rate threshold.

The method may additionally include setting a signal indicative of the DPF having failed when the detected flow rate of particulate matter exiting the DPF is greater than the particulate matter flow rate threshold.

According to the disclosure, the signal indicative of the DPF having failed may be one of a malfunction indicator light (MIL) and an electronic code configured to be retrieved by an authorized access.

The predicted particulate matter flow rate may be a function of time the engine operates at specified conditions.

The predicted particulate matter flow rate may continually increase up to the flow rate threshold as a function of the time the engine operates at specified conditions.

The particulate matter flow rate threshold may correspond to a signal communicated by the PM sensor in a 10-14 micro-ampere ($\mu$A) band.

A system for regulating a diesel engine AT system having a diesel particulate filter (DPF) and a vehicle employing such a system are also provided.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
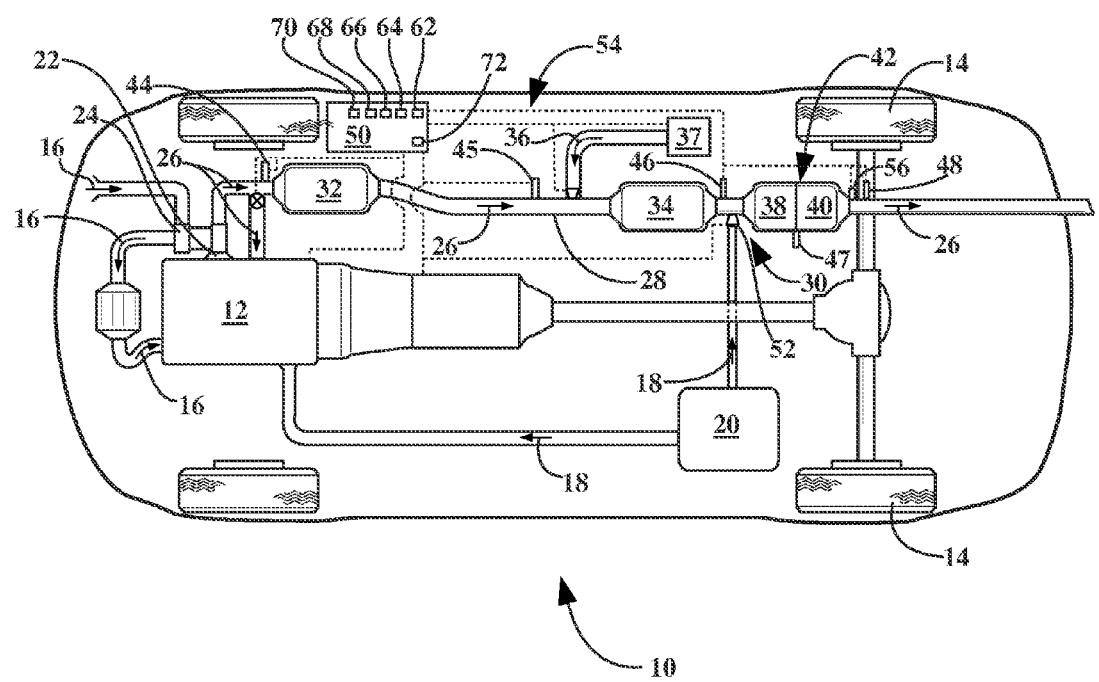
FIG. 1 is a schematic plan view of a vehicle having a diesel engine connected to an exhaust system having an after-treatment (AT) system for reducing exhaust emissions, including a diesel particulate filter (DPF) and a particulate matter (PM) sensor.

Referring to the drawings, wherein like reference numbers refer to like components throughout the several views, FIG. 1 schematically depicts a motor vehicle 10. The vehicle 10 includes a compression-ignition or diesel internal combustion engine 12 configured to propel the vehicle via driven wheels 14. Internal combustion in the diesel engine 12 occurs when a specific amount of ambient air flow 16 is mixed with a metered amount of diesel fuel 18 supplied from a fuel tank 20 and the resultant air-fuel mixture is compressed inside the engine's cylinders (not shown).

As shown, the engine 12 includes an exhaust manifold 22 and a turbocharger 24. The turbocharger 24 is energized by an exhaust gas flow 26 that is released by individual cylinders of the engine 12 through the exhaust manifold 22 following each combustion event. The turbocharger 24 is connected to an exhaust system 28 that receives exhaust gas flow 26, and eventually releases the gas flow to the ambient, typically on a side or aft of the vehicle 10. Although the engine 12 is depicted as having the exhaust manifold 22 attached to the engine structure, the engine may include exhaust passages (not shown) such as generally formed in exhaust manifolds. In such a case, the above passages may be incorporated into the engine structure, such as the engine's cylinder head(s). Furthermore, although the turbocharger 24 is shown, nothing precludes the engine 12 from being configured and operated without such a power augmentation device.

The vehicle 10 also includes a diesel engine after-treatment (AT) system 30. The AT system 30 includes a number of exhaust after-treatment devices configured to methodically remove particulate matter (PM) or soot, i.e., largely carbonaceous byproducts and emission constituents of engine combustion, from the exhaust gas flow 26. As shown, the AT system 30 operates as part of the exhaust system 28, and includes a diesel oxidation catalyst (DOC) 32. The primary function of the DOC 32 is reduction of carbon monoxide (CO) and non-methane hydrocarbons (NMHC). Additionally, the DOC 32 is configured to generate nitrogen dioxide ($NO_2$), which is required by a selective catalytic reduction (SCR) catalyst 34 that is arranged downstream of the DOC 32. The DOC 32 typically contains a catalyst substance made up of precious metals, such as platinum and/or palladium, which function therein to accomplish the above-noted objectives. Generally, with respect to generation of $NO_2$, the DOC 32 becomes activated and reaches operating efficiency at elevated temperatures. Therefore, as shown in FIG. 1, the DOC 32 may be close-coupled to the turbocharger 24 in order to reduce loss of thermal energy from the exhaust gas flow 26 prior to the gas reaching the DOC.

The SCR catalyst 34, on the other hand, is configured to convert $NO_X$ into diatomic nitrogen ($N_2$) and water ($H_2O$) with the aid of the $NO_2$ generated by the DOC 32. The SCR conversion process additionally requires a controlled or metered amount of a reductant having a general name of "diesel-exhaust-fluid" (DEF) 36 when the reductant is employed in diesel engines. The DEF 36 may be an aqueous solution of urea that includes water and ammonia ($NH_3$). The DEF 36 is injected into the exhaust gas flow 26 from a reservoir 37 at a location in the AT system 30 that is downstream of the DOC 32 and upstream of the SCR catalyst 34. Accordingly, the DEF 36 accesses the SCR catalyst 34 as the exhaust gas flow 26 flows through the SCR catalyst. An inner surface of the SCR catalyst 34 includes a wash coat that serves to attract the DEF 36 such that the DEF may interact with the exhaust gas flow 26 in the presence of NO and $NO_2$, and generate a chemical reaction to reduce $NO_X$ emissions from the engine 12.

After the SCR catalyst 34, the exhaust gas flow 26 proceeds to a second diesel oxidation catalyst (DOC) 38 arranged in tandem with and upstream of a diesel particulate filter (DPF) 40. The DOC 38 and DPF 40 may be housed inside a single canister 42, as shown in FIG. 1. The DOC 38 is configured to oxidize hydrocarbons and carbon monoxide present in the exhaust gas flow 26 into carbon dioxide ($CO_2$) and water. The DPF 40 is configured to collect and dispose of the particulate matter emitted by the engine 12 prior to the exhaust gas flow 26 being discharged to the atmosphere. Accordingly, the DPF 40 acts as a trap for removing the particulate matter, specifically, soot, from the exhaust gas flow 26. Similar to the DOC 32 described above, each of the DOC 38 and the DPF 40 typically contains precious metals, such as platinum and/or palladium, which function as catalysts in the subject devices to accomplish their respective objectives. After passing through the DOC 38 and DPF 40 inside the canister 42, the exhaust gas flow 26 is deemed to be sufficiently cleaned of the noxious particulate matter and may then be allowed to exit the exhaust system 28 to the atmosphere.

The AT system 30 may also include a number of temperature probes 44, 45, 46, 47, and 48 configured to sense temperature of the exhaust gas flow 26 at various points downstream of the engine 12. The AT system 30 also includes a controller 50. According to the disclosure, the controller 50 is configured to regulate operation of the engine 12, as well as operation of the exhaust after-treatment devices, namely the DOC 32, SCR catalyst 34, DOC 38, and DPF 40. Each of the temperature probes 44, 45, 46, 47, and 48 are in electrical communication with the controller 50 in order to facilitate regulation of the AT system 30.

The controller 50 may be configured as a central processing unit (CPU) configured to regulate operation of an internal combustion engine 12 (shown in FIG. 1), a hybrid-electric powertrain (not shown), or other alternative types of powerplants, as well as other vehicle systems, or a dedicated controller. In order to appropriately control operation of the AT system 30, the controller 50 includes a memory, at least some of which is tangible and non-transitory. The memory may be any recordable medium that participates in providing computer-readable data or process instructions. Such a medium may take many forms, including but not limited to non-volatile media and volatile media.

Non-volatile media for the controller 50 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 50 may also include a floppy disk, a flexible disk, hard disk, magnetic tape, any other magnetic medium, a CD-ROM, DVD, any other optical medium, etc. The controller 50 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 50 or accessible thereby may be stored in the memory and automatically executed to provide the required functionality.

During operation of the engine 12, hydrocarbons emitted by the engine 12 may at times become deposited on the DPF 40 and consequently affect operating efficiency of the AT system 30. Accordingly, the DPF 40 must be regenerated or cleaned after some particular amount of carbon-based soot is accumulated thereon to burn off the collected particulates. Regeneration of an exhaust after-treatment device may, for example, be commenced after a specific mass flow of air has been consumed by the engine for combustion over a period of time. Generally, such regeneration may be accomplished using high temperature exhaust gas flow to burn off the accumulated particles. The DPF 40 may be regenerated via fuel 18 being injected directly into the exhaust gas flow upstream of the DPF and then having the injected fuel ignited at an appropriate instance. Over time, degradation of the DPF 40 structure may lead to excessive soot leaking past the device.

The AT system 30 additionally includes a specific device such as an HC injector 52 configured to selectively inject a predetermined amount of diesel fuel 18 into the exhaust gas flow 26 following the SCR catalyst 34 and upstream of the DOC 38. Such injection of the diesel fuel 18 is employed to superheat the exhaust gas flow and perform regeneration of the AT system 30, and specifically of the DPF 40. The controller 50 may regulate operation of the HC injector 52 to commence or trigger regeneration of the AT system 30, e.g., via transmission of appropriate control signals, when such is deemed appropriate.

The vehicle 10 also includes a system 54 configured to regulate operation of the AT system 30, and specifically to assess efficiency of the DPF 40. The system 54 includes the DPF 40 and the controller 50, and may also include the DOC 38. The system 54 also includes a particulate matter (PM) sensor 56 positioned downstream of the DPF 40. As the DPF 40 filters particulate matter emitted by the engine 12 and carried by the exhaust gas flow 26, the PM sensor 56 is configured to detect a flow rate 62 of particulate matter exiting the DPF following the subject filtration. The PM sensor 56 is also configured to communicate to the controller 50 a signal in the range of 0-50 micro-amperes (μA) indicative of the detected flow rate 62. The PM sensor 56 may detect particulate matter flowing out of the DPF 40 via collecting soot on the sensor's electrode (not shown). Because soot is generally a conductor of electrical current, the more soot is deposited on the PM sensor's electrode, the higher the transmitted current. As a result, a large soot flake deposited on the sensor electrode, only to be carried off by the exhaust gas flow 26 moments later, may generate a spike in PM sensor 56 current output, thereby negatively impacting detection accuracy and sensitivity of the PM sensor 56. The system 54 is configured to minimize impact of such detection accuracy and sensitivity of the PM sensor 56 to reliably and consistently assess effectiveness of the DPF 40.

As part of operation of the system 54, the controller 50 is configured to monitor the type of loading the engine 12 has been subjected to over any particular length of time. The controller 50 is also configured to receive from the PM sensor 56 a signal indicative of the detected flow rate 62 of particulate matter exiting the DPF 40, and compare the detected flow rate 62 with a predicted particulate matter flow rate 64. The comparison of the detected flow rate 62 of particulate matter exiting the DPF 40 with the predicted particulate matter flow rate 64 can take place as part of tracking the detected flow rate alongside the predicted particulate matter flow rate, i.e., monitoring concurrently or in parallel therewith.

The predicted particulate matter flow rate 64 may correspond to a specific amount of time the engine 12 has operated and the type of loading, i.e., operating conditions, the engine has been subjected to over that length of time. More specifically, the predicted particulate matter flow rate 64 may be an empirically verified flow rate of particulate matter that the PM sensor 56 should detect following a specific amount of loading on the engine 12 and/or over a particular duration of time. Loading on the engine 12 can be determined to within acceptable, i.e., practical, degree of accuracy via a determination of the amount of fuel used by the engine over the particular duration of time. Additionally, appropriate operating conditions for the engine 12 may include more general situations where temperature and flow rate of the exhaust gas flow 26 exiting the engine are above respective predetermined minimum values. During operation of the engine 12, fluctuations in the current output of PM sensor 56 can be identified as being outside of the predicted particulate matter flow rate 64.

Reference data of predicted particulate matter flow rate 64 can be compiled empirically during testing and validation of the AT system 30. For example, an experimental DPF with verified allowable soot leakage can be used to model the predicted particulate matter flow rate 64 as a function of time, and the subject flow rate can subsequently be programmed into the controller 50. More specifically, the predicted particulate matter flow rate 64 can be plotted as an expected particulate matter flow trend line (shown in FIG. 2), expressed as electrical current communicated by the PM sensor 56 as a function of a length of time at identifiable engine operation. The reference data for the establishment of the trend line of predicted particulate matter flow rate 64 can also be tabulated for programming into the controller 50.

Figure 2:
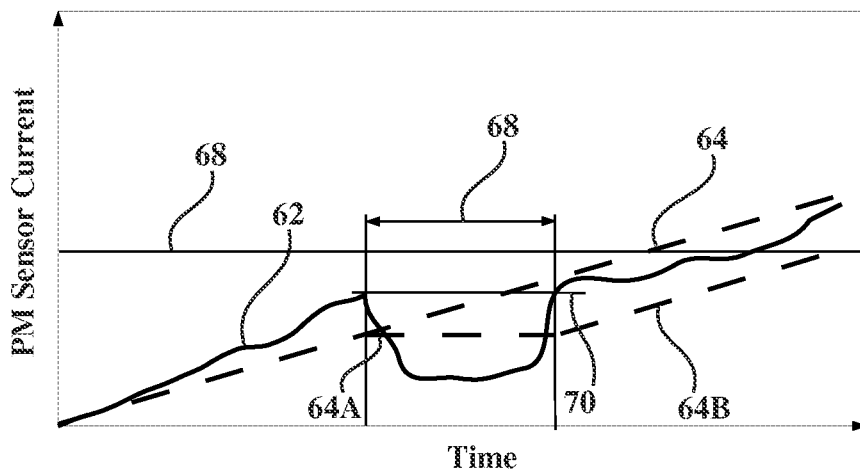
FIG. 2 is a plot of predicted particulate matter flow rate overlaid with flow rate of particulate matter exiting the DPF detected and communicated by the PM sensor according to one scenario.
Figure 3:
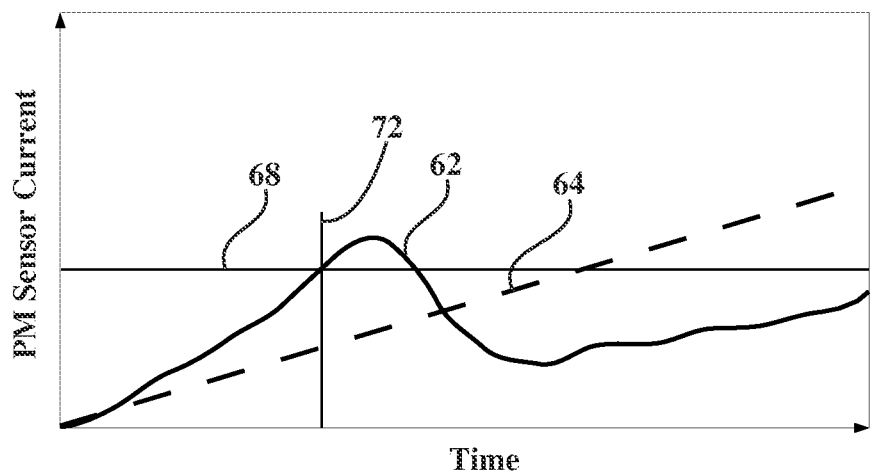
FIG. 3 is a plot of predicted particulate matter flow rate overlaid with flow rate of particulate matter exiting the DPF detected and communicated by the PM sensor according to another scenario.

Also, a known faulty DPF unit, such as with a specific size breach therein can be used to model excessive passage or leakage of soot past the DPF 40 to set a particulate matter flow rate threshold 66 for subsequent programming into the controller 50. As shown in FIGS. 2 and 3, the predicted particulate matter flow rate 64 is a continually rising theoretical curve or trend line up to the particulate matter flow rate threshold 66, as a function of engine operation over time. As part of operation of the system 54, the controller 50 is additionally configured to compare the detected flow rate 62 with the particulate matter flow rate threshold 66. The controller 50 may also be configured to compare the detected flow rate 62 of particulate matter exiting the DPF 40 with a particulate matter flow rate threshold 66. The particulate matter flow rate threshold 66 may correspond to a signal generated by the PM sensor 56 in a 10-14 μA band and communicated to the controller 50.

As shown in FIG. 2, the controller 50 is also configured to pause in time, over a time interval 68, the tracking of the predicted particulate matter flow rate 64, if the detected flow rate 62 of particulate matter exiting the DPF has experienced a decline or a drop. In other words, the controller 50 latches onto a PM sensor 56 current value denoted in FIG. 2 with numeral 70, once the detected flow rate 62 of particulate matter exiting the DPF no longer follows the continually increasing trend line of the predicted particulate matter flow rate 64. The value 70 can be identified as the value of the predicted particulate matter flow rate 64 that time-wise corresponded to the detected flow rate 62 immediately prior to the detected decline thereof. Furthermore, when the detected flow rate 62 returns to a value of the detected flow rate 62 identified immediately before the subject decline, the controller 50 resumes tracking the predicted particulate matter flow rate 64 alongside the detected flow rate 62. In FIG. 2, the frozen predicted flow rate is denoted by numeral 64A and the resumed predicted flow rate is denoted by numeral 64B. The controller 50 is enabled to again regulate operation of the AT system 30 using the detected flow rate 62 once the detected flow rate 62 of particulate matter exiting the DPF 40 returns to the value 70 identified immediately before the decline. Specifically, the controller 50 may regulate operation of the AT system 30 using the detected flow rate 62, if the predicted particulate matter flow rate 64 corresponding in time to, i.e., at the same instance as, the detected flow rate is less than the particulate matter flow rate threshold 66.

As shown in FIGS. 1 and 3, the controller 50 may be additionally configured to set a signal 72 identifying that the DPF 40 is malfunctioning or has failed, if the detected flow rate 62 of particulate matter exiting the DPF exceeds, i.e., is greater than, the particulate matter flow rate threshold 66. Such an assessment is generally indicative of the DPF 40 having degraded and currently unable to remove the necessary amount of particulate matter. The controller 50 can be configured to perform such an assessment and setting of the signal 72 following the regulated injection of diesel fuel 18 via the HC injector 52 to burn off particulate matter collected in the DPF 40. The signal 72 may be generated via a malfunction indicator lamp (MIL) and/or an electronic trouble code embedded in the memory of the controller 50 for subsequent retrieval by an authorized entity. The signal 72 identifying that the DPF 40 is malfunctioning or has failed can be set by the controller 50 after the engine 12 has been operating for any length of time. For such a purpose, the controller 50 may include an internal timer (not shown) configured to assess how much time has elapsed.

Figure 4:
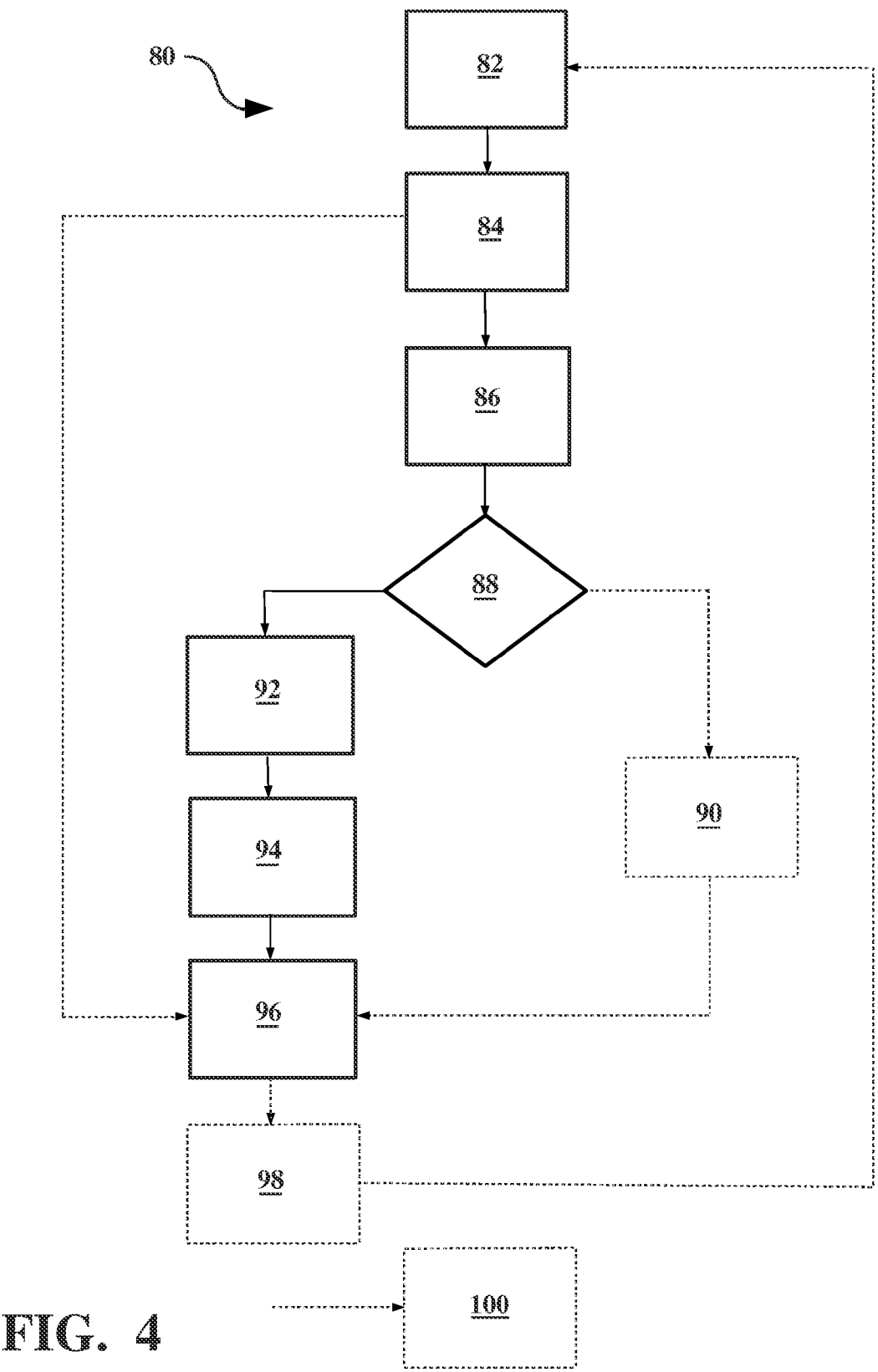
FIG. 4 is a flow diagram of a method of regulating the AT system shown in FIG. 1.

FIG. 4 depicts a method 80 of controlling the diesel engine 12 for assessment of efficiency of the DPF 40 in the AT system 30, as described above with respect to FIGS. 1-3. The method initiates in frame 82, where it includes detecting, via the controller 50, operation of the engine 12 during which the engine generates a flow rate of particulate matter directed via the exhaust system into the DPF 40. After frame 82, the method advances to frame 84 where the method includes detecting, via the PM sensor 56, the flow rate 62 of particulate matter exiting the DPF 40 in response to the flow rate of particulate matter directed into the DPF via the exhaust gas flow 26.

Following frame 84, the method proceeds to frame 86, where the method includes communicating, via the PM sensor 56, to the controller 50 the signal indicative of the detected flow rate 62 of particulate matter exiting the DPF 40. Following frame 86, the method advances to frame 88 and includes tracking the detected flow rate 62 of particulate matter exiting the DPF 40 alongside the predicted particulate matter flow rate 64, as described above with respect to FIGS. 1-2. After frame 88, the method proceeds to frame 90, where the controller 50 will continue tracking the detected flow rate 62 alongside the predicted particulate matter flow rate 64, if the detected flow rate 62 of particulate matter exiting the DPF 40 has continued to increase substantially in parallel with the predicted flow rate 64 or experienced a sharp increase or a spike, If, on the other hand, in frame 88, the detected flow rate 62 of particulate matter exiting the DPF 40 has experienced a decline, the method advances to frame 92 and includes pausing over the time interval 68, via the controller 50, the tracking of the predicted particulate matter flow rate 64. If in frame 92 the tracking of the predicted particulate matter flow rate 64 was frozen, the method may move on from frame 92 to frame 94 where the method will include resuming the tracking the predicted particulate matter flow rate 64 when the detected flow rate 62 finally returns to the value 70 detected before the decline had commenced. After the detected flow rate 62 returns to the value 70 before the decline, the method will proceed from frame 94 to frame 96 where it will include regulating, via the controller 50, operation of the AT system 30 using the detected flow rate 62 of particulate matter exiting the DPF 40. Following any of the frames 86-94, the method may advance to frame 96 for comparing, via the controller 50, the detected flow rate 62 of particulate matter exiting the DPF 40 with the particulate matter flow rate threshold 66.

After frame 96, the method may continue to frame 98, where it includes regulating operation of the AT system 30 using the detected flow rate 62, if the corresponding in time predicted particulate matter flow rate 64 is less than the particulate matter flow rate threshold 66. On the other hand, if the detected flow rate 62 of particulate matter exiting the DPF 40 has been determined in frame 96 as being greater than the particulate matter flow rate threshold 66, the method may advance to frame 100 to set the signal 72 indicative of the DPF 40 having failed. Following any of the frames 88-98, the method may loop back to frame 82. Accordingly, the controller 50 may be programmed to continuously monitor operation of the engine 12, the AT system 30, and the system 54 for efficiency assessment of the DPF 40.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method of regulating an exhaust after-treatment (AT) system having a diesel particulate filter (DPF) in fluid communication, via an exhaust system, with a diesel engine, the method comprising:
   detecting, via a controller, operation of the diesel engine during which the diesel engine generates a flow rate of particulate matter directed via the exhaust system into the DPF;
   detecting, via a particulate matter (PM) sensor, a flow rate of particulate matter exiting the DPF in response to the flow rate of particulate matter directed into the DPF;
   communicating, to the controller via the PM sensor, a signal indicative of the detected flow rate of particulate matter exiting the DPF;
   tracking, via the controller, the detected flow rate of particulate matter exiting the DPF alongside a predicted particulate matter flow rate;
   pausing in time said tracking of the predicted particulate matter flow rate, when the detected flow rate of particulate matter exiting the DPF has experienced a decline;
   resuming said tracking the predicted particulate matter flow rate when the detected flow rate of particulate matter exiting the DPF returns to a value before the decline; and
   regulating, via the controller, operation of the AT system using the detected flow rate of particulate matter exiting the DPF when the detected flow rate returns to the value before the decline.

2. The method of claim 1, further comprising comparing, via the controller, the detected flow rate of particulate matter exiting the DPF with a particulate matter flow rate threshold and regulating operation of the AT system using the detected flow rate of particulate matter exiting the DPF, when the predicted particulate matter flow rate corresponding in time to the detected flow rate is less than the particulate matter flow rate threshold.

3. The method of claim 2, further comprising setting a signal indicative of the DPF having failed when the detected flow rate of particulate matter exiting the DPF is greater than the particulate matter flow rate threshold.

4. The method of claim 3, wherein the signal indicative of the DPF having failed is one of a malfunction indicator light (MIL) and an electronic code configured to be retrieved by an authorized access.

5. The method of claim 2, wherein the predicted particulate matter flow rate is a function of time the engine operates at specified conditions.

6. The method of claim 5, wherein the predicted particulate matter flow rate continually increases up to the flow rate threshold as a function of the time the engine operates at specified conditions.

7. The method of claim 2, wherein the particulate matter flow rate threshold corresponds to a signal communicated by the PM sensor in a 10-14 micro-ampere (μA) band.

8. A system for regulating an exhaust after-treatment (AT) system having a diesel particulate filter (DPF) in fluid communication with a diesel engine, the system comprising:
   an exhaust system providing fluid communication between the diesel engine and the DPF;
   a particulate matter (PM) sensor positioned downstream of the DPF and configured to detect a flow rate of particulate matter exiting the DPF and communicate a signal indicative of the detected flow rate of particulate matter exiting the DPF;
   a device configured to inject diesel fuel into the exhaust system; and
   a controller configured to:
      detect operation of the diesel engine during which the engine generates a flow rate of particulate matter directed via the exhaust system into the DPF;
      receive from the PM sensor the signal indicative of the detected flow rate of particulate matter exiting the DPF in response to the flow rate of particulate matter directed into the DPF;
      track the detected flow rate of particulate matter exiting the DPF alongside a predicted particulate matter flow rate;
      pause in time tracking of the predicted particulate matter flow rate, when the detected flow rate of particulate matter exiting the DPF has experienced a decline;
      resume tracking the predicted particulate matter flow rate when the detected flow rate of particulate matter exiting the DPF returns to a value before the decline; and
      regulate operation of the AT system using the detected flow rate of particulate matter exiting the DPF when the detected flow rate returns to the value before the decline.

9. The system of claim 8, wherein the controller is additionally configured to:
   compare the detected flow rate of particulate matter exiting the DPF with a particulate matter flow rate threshold; and
   regulate operation of the AT system using the detected flow rate of particulate matter exiting the DPF, when the predicted particulate matter flow rate corresponding in time to the detected flow rate is less than the particulate matter flow rate threshold.

10. The system of claim 9, wherein the controller is additionally configured to set a signal indicative of the DPF having failed when the detected flow rate of particulate matter exiting the DPF is greater than the particulate matter flow rate threshold.

11. The system of claim 10, wherein the signal indicative of the DPF having failed is one of a malfunction indicator light (MIL) and an electronic code configured to be retrieved by an authorized access.

12. The system of claim 8, wherein the predicted particulate matter flow rate is a function of time the engine operates at specified conditions.

13. The system of claim 12, wherein the predicted particulate matter flow rate continually increases up to the flow rate threshold as a function of the time the engine operates at specified conditions.

14. The system of claim 9, wherein the particulate matter flow rate threshold corresponds to a signal communicated by the PM sensor in a 10-14 micro-ampere (μA) band.

15. A vehicle comprising: a diesel engine configured to propel the vehicle; an after-treatment (AT) system having a diesel particulate filter (DPF);
   an exhaust system providing fluid communication between the diesel engine and the DPF;
   a particulate matter (PM) sensor positioned downstream of the DPF and configured to detect a flow rate of particulate matter exiting the DPF and communicate a signal indicative of the detected flow rate of particulate matter exiting the DPF;
   a device configured to inject diesel fuel into the exhaust system; and
   a controller configured to:
      detect operation of the diesel engine during which the engine generates a flow rate of particulate matter directed via the exhaust system into the DPF;
      receive from the PM sensor the signal indicative of the detected flow rate of particulate matter exiting the DPF in response to the flow rate of particulate matter directed into the DPF;
      track the detected flow rate of particulate matter exiting the DPF alongside a predicted particulate matter flow rate;
      pause in time tracking of the predicted particulate matter flow rate, when the detected flow rate of particulate matter exiting the DPF has experienced a decline;
      resume tracking the predicted particulate matter flow rate when the detected flow rate of particulate matter exiting the DPF returns to a value before the decline; and regulate operation of the AT system using the detected flow rate of particulate matter exiting the DPF when the detected flow rate returns to the value before the decline.

16. The vehicle of claim 15, wherein the controller is additionally configured to:
   compare the detected flow rate of particulate matter exiting the DPF with a particulate matter flow rate threshold; and
   regulate operation of the AT system using the detected flow rate of particulate matter exiting the DPF, when the predicted particulate matter flow rate corresponding in time to the detected flow rate is less than the particulate matter flow rate threshold.

17. The vehicle of claim 16, wherein the controller is additionally configured to set a signal indicative of the DPF having failed when the detected flow rate of particulate matter exiting the DPF is greater than the particulate matter flow rate threshold.

18. The vehicle of claim 17, wherein the signal indicative of the DPF having failed is one of a malfunction indicator light (MIL) and an electronic code configured to be retrieved by an authorized access.

19. The vehicle of claim 15, wherein the predicted particulate matter flow rate is a function of time the engine operates at specified conditions and continually increases up to the flow rate threshold.

20. The vehicle of claim 16, wherein the particulate matter flow rate threshold corresponds to a signal communicated by the PM sensor in a 10-14 micro-ampere (μA) band.

* * * * *